Dec. 15, 1964  B. B. BLACKFORD  3,161,554
ADHESIVE TAPE
Filed Nov. 5, 1958  2 Sheets-Sheet 1
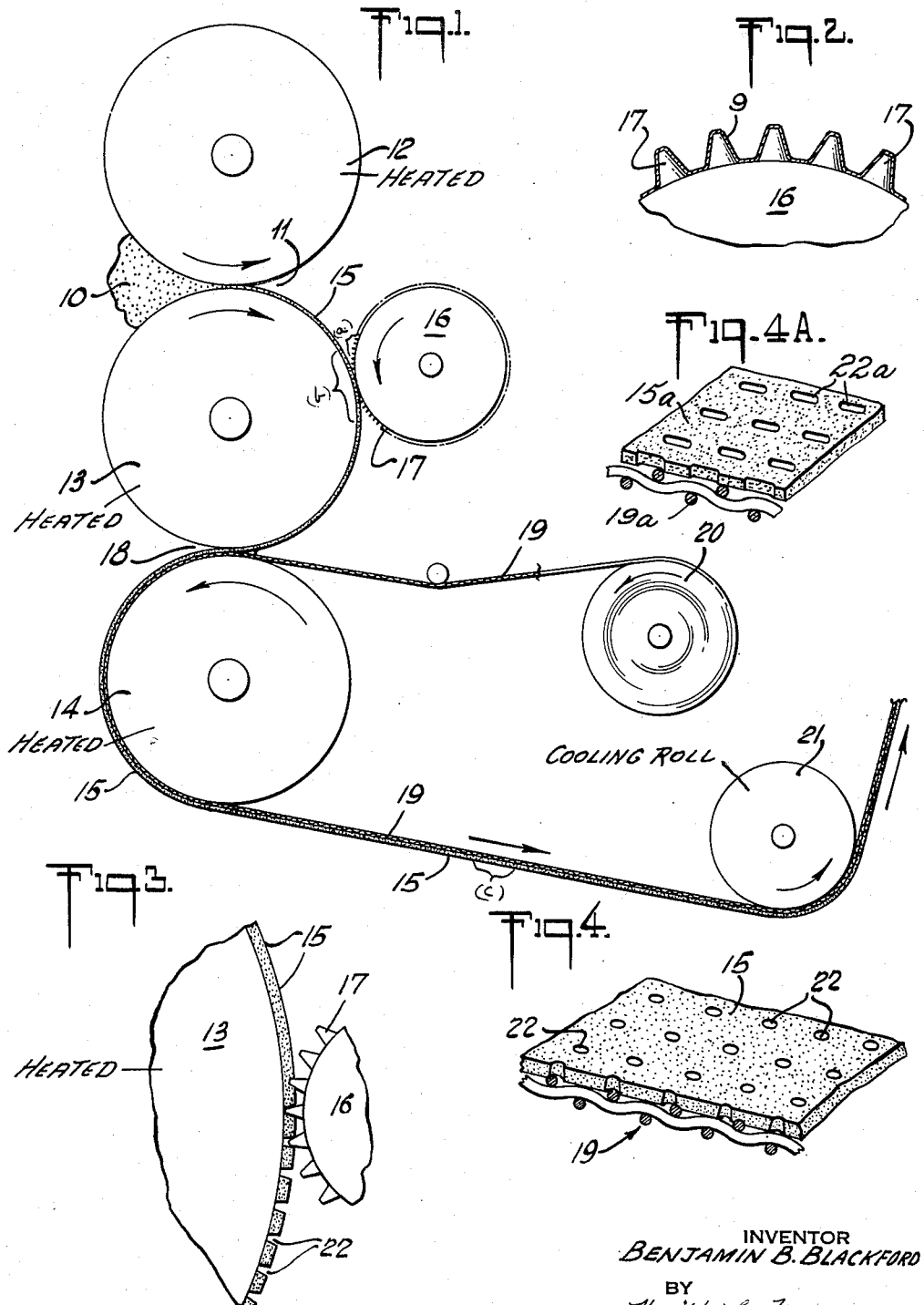
INVENTOR
BENJAMIN B. BLACKFORD
BY
ATTORNEY Dec. 15, 1964     B. B. BLACKFORD     3,161,554
ADHESIVE TAPE
Filed Nov. 5, 1958     2 Sheets-Sheet 2
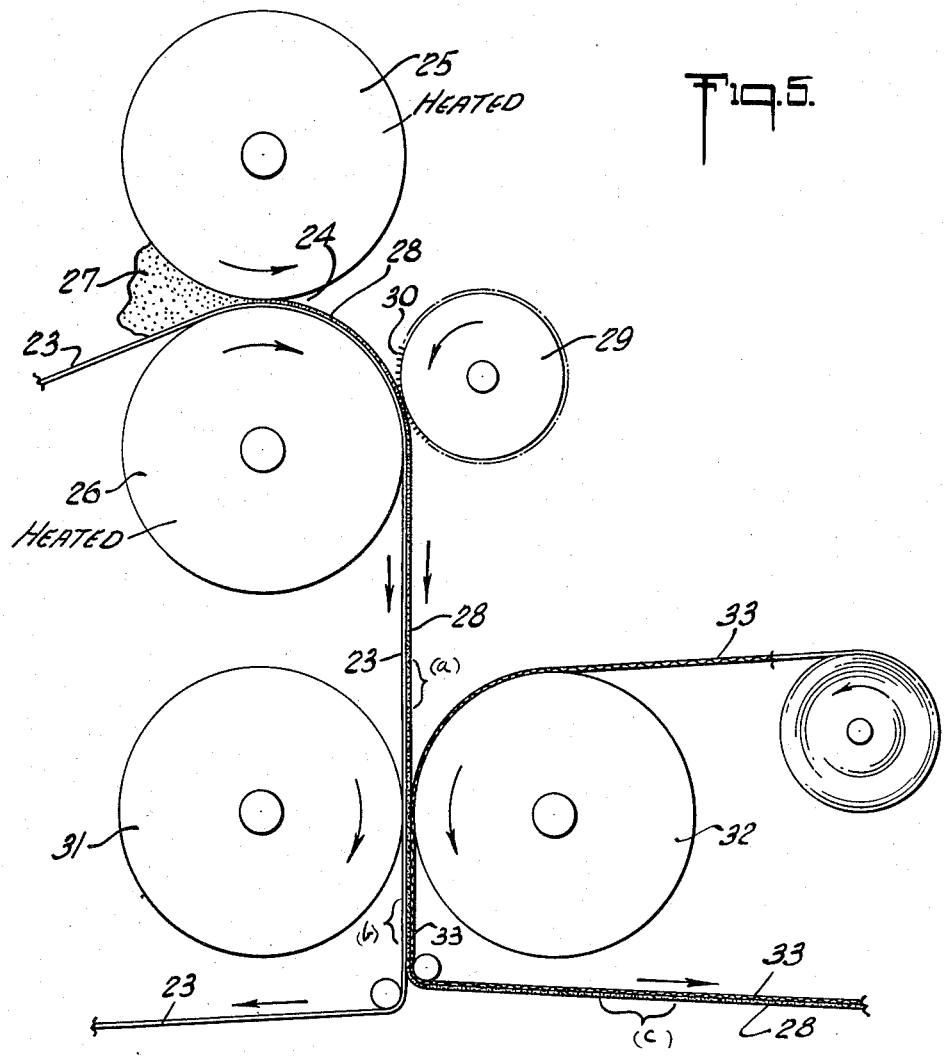
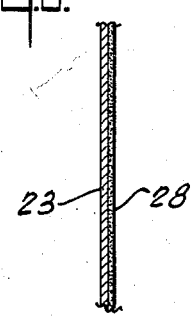
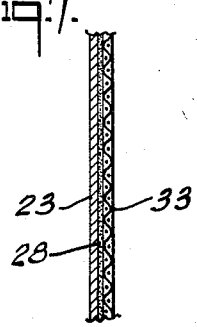
INVENTOR
BENJAMIN B. BLACKFORD
BY
Harold L. Warner
ATTORNEY United States Patent Office 3,161,554
Patented Dec. 15, 1964

3,161,554
ADHESIVE TAPE
Benjamin B. Blackford, Metuchen, N.J., assignor to Johnson & Johnson, a corporation of New Jersey
Filed Nov. 5, 1958, Ser. No. 772,123
18 Claims. (Cl. 156—242)

The present invention is drawn to pressure-sensitive adhesive films and more particularly to the preparation of pervious pressure-sensitive adhesive films without the use of solvents or punching and to the preparation of pervious adhesive tapes containing such films.

There has long been a demand for adhesive tapes which are pervious and permit the ready passage of moisture and air. Various methods for preparing such tapes have been proposed, including pattern spreading of pressure-sensitive adhesives onto pervious fabric backings to provide intermittent areas of fabric which are not coated with the pressure-sensitive adhesive, these non-coated intermittent areas permitting the passage of moisture and air. The methods generally employed for accomplishing this are to use some form of printing whereby the desired pressure-sensitive adhesive pattern is printed onto the surface of the fabric backing. There are, however, several objections to spreading the pressure-sensitive adhesive by printing, the primary objection being that it is generally necessary to use a solvent with the pressure-sensitive adhesive in order to transfer the adhesive, by printing, to the fabric backing. It is also difficult by this process to obtain a sufficiently heavy coating of pressure-sensitive adhesive to give the desired adherence when the pressure-sensitive tape is later used.

The use of solvents for spreading pressure-sensitive adhesive films, particularly in the manufacture of surgical adhesive tapes, is generally undesirable because of the difficulty in removing the solvent later, the remaining solvent often causing irritation to a user of the tape. Another objection to this process is the cost of using solvents which must generally be recovered in order to keep the cost of the process from being prohibitive. Because of this, pressure-sensitive adhesives, particularly when used in the manufacture of surgical tapes, are preferably spread on the fabric backing by a calender process. In the calender process, a thermoplastic pressure-sensitive adhesive mass is first calendered into a thin film of pressure-sensitive adhesive and this film then calendered onto the fabric backing.

Pervious adhesive tapes on which the adhesive has been calender spread have heretofore been prepared by punching holes through the adhesive tape. This, however, is generally an unsatisfactory process. Not only is it uneconomical because of the waste caused by the removal of adhesive and backing, but the punching also substantially weakens the backing. This is particularly true where the backing is a fabric. When attempts were made to use hot needles or other projections for perforating the adhesive film without perforating the cloth backing, other difficulties were encountered. The heated projections, which perforate the adhesive by melting and causing the adhesive to flow out of the way of the projections, also cause an appreciable amount of the adhesive to flow through the fabric backing, particularly in the area immediately under the projections. This results in the back of the tape becoming tacky. This tackiness is objectionable since it interferes with the unwinding of the adhesive tape when later used. Also, the pressure of the heated projections on the fabric backing in many instances tends to cut or damage the fibers of the backing, thus weakening the same. It was further found that the heated projections tended to cause pyrolysis of the adhesive with resulting build-up of adhesive on the heated pins. The result is that frequent cleaning of these projections is necessary and uniform perforations are difficult to obtain over an extended period of operation.

It is the object of the present invention to prepare perforated pressure-sensitive adhesive films by perforating with hot projections or pins while avoiding pyrolysis of the adhesive on the hot projections. It is a further object of this invention to prepare perforate adhesive coatings without use of solvents or punching. It is a still further object of the present invention to prepare fabric-backed adhesive tapes in which the backing has not been weakened, in which the openings through the adhesive film remain open, and which are free from flow of adhesive through the backing to the uncoated side. Other objects and advantages of this invention will become apparent from the following description taken in connection with the accompanying drawings wherein are set forth by way of illustration and example certain embodiments of this invention.

Referring to the drawings,

FIG. 1 is a schematic view showing the preparation of cloth-backed adhesive tape containing a perforate adhesive coating;

FIG. 2 is an enlarged view of section (a) of FIG. 1 showing the heated perforating projections;

FIG. 3 is an enlarged view of section (b) of FIG. 1 showing perforation of the adhesive film;

FIG. 4 is an enlarged cross-sectional view of the pressure-sensitive adhesive tape as it appears at section (c) of FIG. 1;

FIG. 4A is an enlarged cross-sectional view similar to that of FIG. 4 and differing mainly in that the openings in the pressure-sensitive adhesive film are elongated;

FIG. 5 is a schematic view showing the preparation of adhesive tape having an elastic fabric backing and a perforated pressure-sensitive adhesive coating;

FIG. 6 is an enlarged view of section (a) of FIG. 5;

FIG. 7 is an enlarged view of section (b) of FIG. 5; and

FIG. 8 is an enlarged view of section (c) of FIG. 5.

Pressure-sensitive adhesives of the type generally used in surgical tapes are extremely tacky at elevated temperatures and are generally of a relatively soft consistency. Also, the composition of the pressure-sensitive adhesive is generally of such nature that some deterioration may be expected to occur if subject to too high temperatures. Although it has heretofore been proposed to perforate pressure-sensitive adhesive film coatings by using heated projections, difficulty has been encountered in obtaining a sufficiently high temperature in the piercing pins or projections to cause rapid melting or flow of the pressure-sensitive adhesive in the immediate vicinity of the heated projections without using such high temperatures as to cause overheating of the pressure-sensitive adhesive with partial decomposition and build-up of heat decomposed adhesive on the perforating pins. It has now been found that pressure-sensitive adhesive film can be perforated rapidly and good clean perforations obtained through the use of heated projections without pyrolysis and accumulation of adhesive on the heated projections if perforating pins or other projections are used that have first been coated with a release agent. Although the application of this discovery, which is a part of the present invention, avoids the problem of pyrolysis and build-up of adhesive on the perforating pins, it does not completely avoid the problems heretofore mentioned in connection with the use of hot pins or other projections in the manufacture of perforated pressure-sensitive cloth-backed adhesive tapes, namely, flow of the adhesive through the cloth backing and weakening of the cloth backing during perforation. In accordance with the present invention, these difficulties have also been avoided by first forming and perforating the pressure-sensitive film and then uniting the perforated film with the fabric backing, as hereinafter more fully described. Although it might normally be expected that the perforations would not remain open in the somewhat fluid pressure sensitive adhesive film because of adhesive flow while the perforated film is pressed onto a fabric backing, in actual practice the openings are maintained substantially as formed and an excellent, pervious, strong adhesive tape is obtained.

It is generally preferred to carry out the perforation of the adhesive through the use of a steel or other metal roll having a plurality of projections which are heated during the perforating process. In preparing the roll for use, the whole surface of the roll is coated with the release agent. The roll is then heated, generally for a period of at least ½ hour, to set the release agent on the surface of the roll and projections protruding therefrom. In heating the roll, temperatures in excess of about 150° F. are generally used. In practicing the invention, it was found that various release agents could be used, perforated pressure-sensitive adhesive films having been prepared through the use of various silicone polymers, stearo chromic chloride Werner complexes and isopropoxy titanium stearate. The best results, however, were obtained when the release agent was a silicone type resin, the preferred release agents being crosslinked methyl hydrogen substituted polysiloxane release agents of the general formula

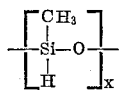

either alone or preferably as mixtures in amounts of 2 to 98% with polysiloxanes having the general formula

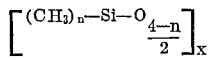

in which $n$ may have values of 0, 1, 2 or 3. The methyl silicone ratio for the mixtures falls between 1.3 and 2.0.

The preparation of cloth-backed pressure-sensitive adhesive tapes in accordance with the present invention is further illustrated by reference to the drawings. Referring to FIG. 1, a pressure-sensitive adhesive mass 10 is placed at the nip 11 occurring between the top roll 12 and the middle roll 13 of a conventional 3-roll calender. The calender rolls are generally maintained at a temperature of 180 to 320° F. for the top roll 12, a temperature of 140 to 240° F. for the middle roll 13, and a temperature of 80 to 180° F. for the bottom roll 14. The preferred temperatures are respectively 240 to 290° F. for the top roll, 150 to 180° F. for the middle roll, and 100 to 120° F. for the bottom roll.

The pressure-sensitive adhesive mass 10 is calendered into a film 15 which adheres to the surface of roll 13. Adjacent roll 13 is a perforating roll 16 containing projections 17, roll 16 being spaced with respect to roll 13 so that the ends of the projections 17 just contact the surface of roll 13. The projections, which preferably have a diameter of .004″ to .030″, may take any form depending on the type hole desired in the adhesive. In the preferred practice, the projections have flat ends, these giving the cleanest perforations.

The perforating roll 16 is heated by any conventional means, such as by heated fluid or electrically, to a temperature such that the projections 17 are maintained at a temperature of about 150 to 400° F., the preferred temperature being about 300 to 325° F. The projections 17 should be sufficiently long so that the surface of the pressure-sensitive adhesive film 15 never contacts the surface of the roll 16 between the projections 17. This is best illustrated in FIG. 3. Since the pressure-sensitive adhesive film generally varies in thickness from about .001″ to .010″, it is preferred that the heated projections 17 be at least .020″ in length. As previously stated, the projections 17 are coated with a release agent which is cured onto the projections prior to their use for perforating the pressure-sensitive adhesive film 15. The coated projections 17 are best illustrated in FIG. 2, part of the projections being shown in cross section to better illustrate the coating 9 of release agent.

The pressure-sensitive adhesive film 15, after being formed, is maintained at a temperature only slightly below its flow temperature by heated roll 13 on which it is carried. As the film passes roll 16, the heated projections or pins 17 enter the warm film 15 causing a lateral flow of the pressure-sensitive adhesive away from the area occupied by the projections. Roll 16 is preferably rotated at the same peripheral speed as roll 13. However, where elongated openings in the pressure-sensitive adhesive are desired rather than round or square holes, this can readily be accomplished by having the roll 16 rotate at a slightly slower or faster peripheral speed than that of roll 13.

After passing between rolls 13 and 16, the perforated pressure-sensitive adhesive film, which is still maintained on the surface of roll 13, passes through the nip 18 between rolls 13 and 14. At this point, it is pressed into intimate contact with the surface of a fabric web 19 fed from a roll of fabric 20. The fabric 19 with the pressure-sensitive adhesive film 15 is then passed around a cooling roll drum 21 which serves to cool the pressure-sensitive adhesive film down to about room temperature. The fabric with the perforated pressure-sensitive adhesive coating is then formed into a roll which is later unrolled, slit and formed into smaller rolls of pressure-sensitive adhesive tape.

The perforate adhesive tape as it leaves roll 14 is best illustrated in FIG. 4 which is an enlarged view of section (c) of FIG. 1. The adhesive tape consists of the fabric backing 19 bonded to the perforated adhesive film 15. Since the film has been perforated prior to combining with the fabric, the fabric has neither been weakened by the perforating process nor has any adhesive been forced through the fabric to make the back of the tape tacky. Also, since the perforating is done between the smooth hard surface of roll 13 and projections 17, the holes 22 are cleanly formed, the surface of the fabric at the bottom of each hole being free of adhesive. As a result, a highly porous adhesive tape is obtained which, in the area of perforations, is as permeable as the fabric used. The process may be used to make pressure-sensitive adhesive tapes with any desired type of fabric backing, the permeability of the final product depending on the permeability of the fabric used as well as the number and size of the perforations in the adhesive film. The process is thus equally suitable with highly permeable readily wet fabrics as well as for making adhesive tapes from fabrics that have been treated with a water repellent so that the final tape, even though pervious to air, will not let water pass therethrough.

The practice of the present invention in making pervious fabric-backed pressure-sensitive adhesive tapes is further illustrated by the following example:

EXAMPLE

A compound of the following composition was preheated on a rubber mill to 260° F.:

| | Percent |
|---|---|
| Pale crepe rubber | 33 |
| Disproportionated rosin | 28 |
| Lanolin | 10 |
| Cornstarch | 5 |
| Zinc oxide | 8.5 |
| Aluminum hydrate | 9.0 |
| Zinc dibutyl dithiocarbamate | 1.5 |
| Titanium dioxide | 5 |

This compound was fed to a calender with top roll rotating at ⅓ the speed of the center and bottom rolls and the gap between the top roll and center roll set to deliver a film of adhesive mass 0.005″ thick. Temperature of the top roll was 260° F., center roll 150° F. and bottom roll 100° F.

An engraved roll having 261 projections per square inch was used for perforating the film of adhesive mass. The projections on the roll were 0.020 x 0.022 inch at the base and 0.030 inch high with tapering cross section toward their ends. The surface of the roll, including the projections, contained a cured silicone film formed of a mixture of methyl hydrogen substituted polysiloxane and polysiloxanes of the type heretofore described.

The perforating roll, which was heated to 325° F. was pressed against the adhesive mass until it contacted the surface of the center roll of the calender. A pressure of approximately 200 lbs. per inch of roll width sufficed to penetrate the adhesive mass and leave a clean impression on the roll of the engraved pattern.

Cotton cloth of 80 x 80 construction having a weight of 2.8 oz./sq. yd. was pressed against the perforated adhesive mass by passing it between the bottom and center rolls of the calender under pressure by the bottom roll. The spread sheet was stripped off the center roll of the calender under tension, passed over a cooling drum and wound on a drum to yield a finished roll of adhesive plaster. The product was slit and wound into rolls of adhesive tape by conventional means.

Under optical examination, the product was found to have rectangular holes which presented a surface with 11.2% open area. Aging of the product rolls in air at 120° F. for 30 days and steam sterilization at 255° F. for 30 minutes did not materially affect the extent of open area. Tensile strength of the backing was unaffected. Testing moisture vapor permeability of the product by the method shown in U.S. Govt. Specification JANP–127 with double the recommended weight of absorbent indicated that the moisture vapor transmission rate of random samples varied from 350 to 450 grams per square meter per 24 hours.

The perforated pressure-sensitive adhesive film prior to its application to the fabric 19 may, if desired, be removed from the surface of the roll 13 and cooled so as to give a continuous strip of pressure-sensitive adhesive having perforations therethrough. This pressure-sensitive adhesive strip may then be applied to any object to which it is desired to give a perforate pressure-sensitive adhesive surface. This is particularly useful in connection with the preparation of adhesive tapes having elastic fabric backings. Although elastic fabrics can be coated with perforate pressure-sensitive adhesive films in the manner described in connection with FIG. 1 of the drawings, difficulty is encountered by the fabric stretching at the point of release of the adhesive film from roll 13, since appreciable pull is exerted on the adhesive-coated fabric at this point. When preparing perforate adhesive-coated elastic fabrics, it is therefore preferred to use the process as described in connection with FIG. 5.

Referring to FIG. 5, a carrier paper 23 having a low adherence to pressure-sensitive adhesives is passed between the nip 24 of calender rolls 25 and 26. These rolls are heated to temperatures similar to the temperatures of rolls 12 and 13 of FIG. 1, roll 25 having a temperature similar to that of roll 12 of FIG. 1 and roll 26 having a temperature similar to that of roll 13. As the carrier paper passes between the nip 24, a pressure-sensitive adhesive mass 27 is calendered onto the carrier paper as a thin film 28. The carrier paper together with the pressure-sensitive adhesive film 28 then passes, while still on the surface of heated roll 26, by a heated perforating roll 29 which is similar to and acts in a manner similar to perforating roll 16 of FIG. 1. Roll 29, however, is spaced from roll 26 so that there is a slight clearance between the tips of the perforating projections 30 and the surface of roll 26, the clearance being equal to the thickness of the carrier paper 23. As perforation of the adhesive film is done solely by melting the pressure-sensitive adhesive in the vicinity of projections 30, no perforation of the carrier strip 23 occurs.

The carrier strip together with the adhesive film is then removed from roll 26 at which point it may be rolled up and stored for later use, such as application to an elastic fabric, or may be passed directly between rolls 31 and 32 together with a strip of elastic fabric 33 which is pressed against the perforated pressure-sensitive adhesive film. On leaving rolls 31 and 32, the carrier backing 23 is removed, leaving the elastic fabric with the perforated pressure-sensitive adhesive film secured thereto.

In practicing the present invention as described in the preparation of adhesive tapes having elastic fabric backings, a carrier paper should be used that has a very low adherence to the adhesive film. For this purpose, it is generally preferred to use carrier papers having silicone resin release coatings, the preferred release coatings being mixtures of methyl hydrogen substituted polysiloxanes of the general formula

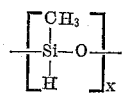

with polysiloxanes of the general formula

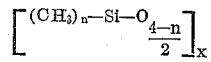

of the type heretofore described.

The invention is primarily concerned with the preparation of fabric-backed pressure-sensitive adhesive tapes. However, the use of a perforating roll in which the heated projections are coated with a release agent is also applicable to the preparation of perforated film-backed adhesive tapes. Although it is generally the practice to perforate film-backed pressure-sensitive adhesive tapes by punching out sections of the tape, such tapes can be prepared by passing heated projections through both the pressure-sensitive adhesive coating and the thermoplastic film backing. However, such a process is subject to the difficulty previously mentioned of pyrolysis of the adhesive and build-up of pyrolized adhesive on the perforating projections. By using a perforating roll with perforating projections coated with a release agent as heretofore described, this difficulty of adhesive build-up and pyrolysis is avoided.

Where the film material that is to form the backing of the tape is of a pervious nature, pervious pressure-sensitive adhesive tapes can readily be prepared in accordance with the process described in connection with FIG. 1, or if the film to be used as the backing is too yielding to permit removal without stretching from roll 13 (FIG. 1), the tape may be perforated in accordance with the process described in connection with FIG. 5. This is readily done by substituting the film backing in place of the cloth backing. However, if the film material used as the backing is not already pervious, then the film must also be perforated.

In preparing film-backed pressure-sensitive adhesive tapes of this type, I prefer to use apparatus somewhat similar to that described in FIG. 5. The backing film removably supported on a carrier strip is passed between the nip 24 of heated rolls 25 and 26. As it passes between rolls 25 and 26, the pressure-sensitive adhesive mass from bank 27 is calendered onto the surface of the backing film and the adhesive mass and backing then perforated as the carrier strip with backing film and adhesive coating pass between roll 26 and perforating roll 29. Since the spacing of perforating roll 29 with respect to the surface of roll 26 is so adjusted that the distance between the ends of the projections 30 and the surface of roll 26 is only slightly less than the thickness of the carrier strip, only the backing film and its adhesive coating are perforated. During and after removal of the perforated film-backed tape from the roll 26, the carrier strip continues to support the backing film until the same has cooled to room temperature. The perforated film with adhesive may then be removed from the carrier strip or the carrier strip with the adhesive-coated film rolled and stored for later processing into adhesive bandages or rewinding on removal of the carrier strip into rolls of perforate film-backed tape.

By practicing the present invention, uniform clean perforations through the adhesive mass can be obtained. The process is applicable with any of the generally used thermoplastic pressure-sensitive adhesives. Such compositions are well known in the art and described in patents and other literature, for example, U.S. Patent 2,484,060, issued October 11, 1949 to H. A. Wing, and U.S. Patent 2,647,843, issued August 4, 1953 to C. W. Bemmels. Where fabric-backed pressure-sensitive adhesive tapes are made in accordance with the present invention, not only is the tape found to be highly pervious, such for example as illustrated by the blowing of smoke therethrough, but the back of the tape is completely free from any pressure-sensitive adhesive. Also, the fabric backing is in no way weakened by the perforating process.

Having thus described my invention, I claim:

1. The method of perforating a film of pressure-sensitive adhesive wherein the adhesive of said film has a flow temperature below the temperature at which loss of adhesiveness due to pyrolysis occurs, comprising supporting said film in a heated softened state on a heated, imperforate, essentially non-yielding supporting surface, the temperature of which surface is sufficiently high to maintain said adhesive in its softened state but below the temperature at which said adhesive will be decomposed, pressing heated projections coated with a release agent into said heat-softened adhesive film and against said film supporting surface while said film is supported thereon and flowing said film laterally without destroying the adhesiveness of the same in the area of penetration of said heated projections, withdrawing said heated projections and then removing the pressure-sensitive adhesive film with perforations formed therein from said heated supporting surface.

2. The method of claim 1 wherein said thermoplastic pressure-sensitive adhesive film after withdrawing said heated projections is bonded to a flexible pervious backing by pressing said adhesive film into intimate contact with said backing while maintaining the perforations in said pressure-sensitive adhesive film open.

3. The method of perforating a film of pressure-sensitive adhesive wherein the adhesive of said film has a flow temperature below the temperature at which loss of adhesiveness due to pyrolysis occurs, comprising supporting said film in a heated softened state on a heated, imperforate, essentially non-yielding supporting surface, the temperature of which surface is sufficiently high to maintain said adhesive in its softened state but below the temperature at which said adhesive will be decomposed, pressing projections at a temperature of 150° to 400° F. and coated with a silicone release agent into said heat-softened adhesive film and against said film supporting surfaces while said film is supported thereon and flowing said film laterally without destroying the adhesiveness of the same in the area of penetration of said heated projections, withdrawing said heated projections and then removing the pressure-sensitive adhesive film with perforations formed therein from said heated supporting surface.

4. The method of claim 3 in which said release agent is a cross-linked methyl hydrogen substituted polysiloxane of the general formula

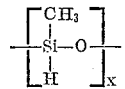

5. The method of claim 3 in which said release agent is a mixture of methyl hydrogen substituted polysiloxane of the general formula

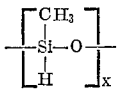

and polysiloxanes having the general formula

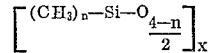

in which $n$ has values of 0, 1, 2, and 3, the methyl to siloxane ratio of said mixture being within the range of 1.3 to 2.0.

6. The method of making pervious pressure-sensitive adhesive-coated sheets comprising heating a thermoplastic pressure-sensitive adhesive having a flow temperature below the temperature at which loss of adhesiveness due to pyrolysis occurs, calendering said adhesive while in a heat-softened state into a pressure-sensitive adhesion film by passing said adhesive while in said heat-softened state between a pair of calender rolls having heated, imperforate, essentially non-yielding surfaces, supporting said film on the heated surface of one of said rolls, maintaining the temperature of said supporting roll surface, while said adhesive film is supported thereon, at a temperature sufficiently high to maintain the adhesive of said film in its heat-softened state but below the temperature at which said adhesive will be decomposed, forming openings in said adhesive film while so supported by pressing against said film a third roll containing a plurality of heated projections coated with a release agent, said heated projections passing into said heat-softened adhesive film to cause lateral flow of the adhesive without decomposition of the same in the area of contact of said projections with said adhesive film, withdrawing said projections from said film and pressing said film of pressure-sensitive adhesive with said openings therein into intimate contact with the surface of a pervious fabric to bond said adhesive film to said fabric while avoiding closing of said openings in said adhesive film.

7. The method of making pervious pressure-sensitive adhesive-coated sheets comprising placing a mass of heat-softened thermoplastic pressure-sensitive adhesive, having a flow temperature below the temperature at which loss of adhesiveness due to pyrolysis occurs, at the nip between the upper and middle heated rolls of a three-roll calender, forming a film of said heat-softened pressure-sensitive adhesive adherent to the middle roll, maintaining the temperature of the surface of said middle calender roll sufficiently high to maintain said adhesive in its heat-softened state, perforating said heat-softened film of pressure-sensitive adhesive, while supported on said middle calender roll, by pressing against said adhesive film heated release-coated projections carried by a piercing roll, which projections cause lateral flow of said adhesive without decomposition of the same in the area of contact of said projections with said adhesive film, withdrawing said projections from said adhesive film leaving said film supported on said center calender roll in a heat-softened, perforate state, passing a pervious fabric between the nip formed by the middle and bottom rolls of said three-roll calender and calendering said perforated pressure-sensitive adhesive film, while maintaining the perforations therein open, onto said fabric as its passes through said nip to bond said perforate adhesive film to said fabric.

8. The method of making pervious pressure-sensitive adhesive-coated sheets comprising placing a mass of heat-softened thermoplastic pressure-sensitive adhesive, having a flow temperature below the temperature at which loss of adhesiveness due to pyrolysis occurs, at the nip formed between the upper and middle rolls of a three-roll calender, forming a film of said heat-softened pressure-sensitive adhesive adherent to the middle roll, maintaining the temperature of the surface of said middle calender roll sufficiently high to maintain said adhesive in its heat-softened state, perforating said heat-softened film of pressure-sensitive adhesive, while supported on said middle calender roll, by pressing against said pressure-sensitive adhesive film heated release-coated projections carried by a piercing roll, said piercing roll being spaced in relation to said middle roll such that the ends of said projections touch the surface of said middle roll, said projections passing into said adhesive film as said adhesive film is carried by said middle calender roll past said piercing roll, the projections causing lateral flow of said adhesive without decomposition of the same in the area of contact of said projections with said adhesive film, said supported adhesive film containing perforations in the area of said lateral flow on leaving said piercing roll while still supported on said middle calender roll, passing a pervious fabric between the nip formed by the middle and bottom rolls of said three-roll calender and calendering said perforated pressure-sensitive adhesive film, while maintaining the perforations therein open, onto said fabric as it passes through said nip to bond said perforate adhesive film to said fabric, the middle and bottom rolls of said three-roll calender being rotated at the same peripheral speed as the linear speed of said fabric, said top roll being maintained at a temperature of 180 to 320° F., said middle roll at a temperature of 140 to 240° F. and said bottom roll at a temperature of 80 to 100° F.

9. The process of claim 8 in which the projections carried by said piercing roll are heated to a temperature of 150 to 400° F.

10. The process of claim 9 wherein the projecting pins are coated with a silicone resin release agent.

11. The process of claim 9 in which the upper roll is maintained at a temperature of 240 to 290° F., the middle roll at a temperature of 150 to 180° F. and the bottom roll at a temperature of 100 to 120° F. and said projecting pins maintained at a temperature of 300 to 325° F.

12. The process of claim 9 wherein the perforating roll is rotated at the same peripheral speed as that of the middle roll.

13. The method of making pervious elastic fabric-backed pressure-sensitive adhesive tapes comprising heating a thermoplastic pressure-sensitive adhesive having a flow temperature below the temperature at which loss of adhesiveness due to pyrolysis occurs, calendering said adhesive while in a heat-softened state into an adhesive film onto an imperforate heated surface coated with a release agent, supporting said heat-softened adhesive film on said release-coated heated surface, maintaining said release-coated heated surface, while said adhesive film is supported thereon, at a temperature sufficiently high to maintain the adhesive of said film in its heat-softened state but below the temperature at which said adhesive will be decomposed, forming openings in said adhesive film while so supported by pressing against said adhesive film a plurality of heated projections to cause lateral flow of said adhesive without decomposition of the same in the area of contact of said projections with said adhesive film, withdrawing said projections from said adhesive film, pressing said adhesive film with said openings therein into intimate contact with a sheet of porous, elastic fabric to bond said adhesive film to said backing while avoiding closing of said openings in said adhesive film, and separating said release-coated surface from said perforate adhesive film.

14. The method of making pervious pressure-sensitive adhesive-coated sheets from thermoplastic adhesive having a flow temperature below the temperature at which loss of adhesiveness due to pyrolysis occurs, comprising calendering said adhesive while in a heat-softened state into a pressure-sensitive adhesive film by passing said adhesive while in said heat-softened state between a pair of calender rolls having heated, imperforate, essentially non-yielding surfaces, supporting said adhesive film on the heated surface of one of said rolls, maintaining the temperature of said supporting roll surface, while said adhesive film is supported thereon, at a temperature sufficiently high to maintain the adhesive of said film in an inelastic, flowable, heat-softened state but below the temperature at which said adhesive will be decomposed, forming openings in said adhesive film while so supported by pressing against said adhesive film a plurality of heated projections having a temperature of a least 150° F. to cause lateral flow of said adhesive without decomposition of the same in the area of contact of said projections with said adhesive film, withdrawing said heated projections from said adhesive film and pressing said film with said openings therein into intimate contact with the surface of a pervious, flexible backing to bond said adhesive film to said backing while avoiding closing of said openings in said adhesive film and maintaining said openings in their open state while cooling said adhesive film while bonded to said pervious backing to provide a permanently porous pressure-sensitive, adhesive-coated sheet.

15. The method of making perforate pressure-sensitive adhesive films comprising heating a thermoplastic pressure-sensitive adhesive having a flow temperature below the temperature at which loss of adhesiveness due to pyrolysis occurs, calendering said adhesive while in a heat-softened state onto a flexible imperforate carrier strip as said carrier strip is passed between two heated rolls of a calender, supporting said carrier strip with adhesive film calendered thereon on the heated surface of one of said rolls, maintaining the surface of said supporting roll while said carrier and adhesive film are supported thereon at a temperature sufficiently high to maintain the adhesive of said adhesive film in its heat-softened state but below the temperature at which said adhesive will be decomposed, perforating said adhesive film while so supported by pressing against said film and said carrier sheet a third roll containing a plurality of heated projections coated with a release agent, said projections causing lateral flow of said adhesive without decomposition of the same in the area of contact of said projections with said adhesive film and without perforating said carrier strip, said roll with said projections being spaced from said supporting roll a distance such that the ends of said projections contact said carrier strip when supported on the surface of said supporting roll but do not perforate the same.

16. The method of claim 15 in which said perforating projections are heated to a temperature of 150 to 400° F.

17. The method of claim 16 wherein said film of pressure-sensitive adhesive is spread on a thermoplastic film backing which is releasably secured to said carrier strip, said heated projections passing through both said film of pressure-sensitive adhesive and said thermoplastic film backing but not through said carrier strip and then separating said carrier strip from said perforated film backing and adhesive film.

18. The method of making pervious pressure-sensitive adhesive-coated sheets comprising heating a thermoplastic pressure-sensitive adhesive having a flow temperature below the temperature at which loss of adhesiveness due to pyrolysis occurs, calendering said adhesive while in a heat-softened state into a pressure-sensitive adhesive film by passing said adhesive while in said heat-softened state between a pair of calender rolls having heated, imperforate, essentially non-yielding surfaces, supporting said adhesive film on the heated surface of one of said rolls, maintaining the temperature of said supporting roll surface, while said adhesive film is supported thereon, at a temperature sufficiently high to maintain the adhesive of said film in its heat-softened state but below the temperature at which said adhesive will be decomposed, forming elongated openings in said film while so supported by passing against said film a plurality of projections while moving said adhesive film and said projections relative to each other to cause lateral flow of said adhesive to either side of said projections without decomposition of said adhesive, withdrawing said projections from said adhesive film and pressing said film with said elongated openings therein into intimate contact with the surface of a pervious, flexible backing to bond said adhesive film to said backing while avoiding closing of said openings in said adhesive film.

References Cited in the file of this patent

UNITED STATES PATENTS

| | | |
|---|---|---|
| 2,055,002 | Chandler | Sept. 22, 1936 |
| 2,186,771 | Smith | Jan. 9, 1940 |
| 2,244,550 | Chandler | June 3, 1941 |
| 2,426,257 | Ziegler | Aug. 26, 1947 |
| 2,588,367 | Dennett | Mar. 11, 1952 |
| 2,591,383 | Spalding | Apr. 1, 1952 |
| 2,647,065 | Scholl | July 28, 1953 |
| 2,739,919 | Artzt | Mar. 27, 1956 |
| 2,740,403 | Schueler | Apr. 3, 1956 |
| 2,748,863 | Benton | June 5, 1956 |
| 2,779,851 | Vogt | Jan. 29, 1957 |
| 2,795,521 | Blackford | June 11, 1957 |
| 2,796,913 | Fener et al. | June 25, 1957 |
| 2,813,052 | Lancaster | Nov. 12, 1957 |
| 2,814,710 | Schuetze | Nov. 26, 1957 |